(12) United States Patent  
Renett

(10) Patent No.: US 8,241,006 B2
(45) Date of Patent: Aug. 14, 2012

(54) TURBOCHARGER

(75) Inventor: Michael Renett, Oberwiesen (DE)

(73) Assignee: BorgWarner Inc., Auburn Hills, MI (US)

( * ) Notice: Subject to any disclaimer, the term of this patent is extended or adjusted under 35 U.S.C. 154(b) by 575 days.

(21) Appl. No.: 12/443,851

(22) PCT Filed: Oct. 11, 2007

(86) PCT No.: PCT/EP2007/008855
§ 371 (c)(1),
(2), (4) Date: Apr. 1, 2009

(87) PCT Pub. No.: WO2008/046556
PCT Pub. Date: Apr. 24, 2008

(65) Prior Publication Data
US 2010/0040473 A1    Feb. 18, 2010

(30) Foreign Application Priority Data
Oct. 13, 2006 (DE) .......................... 10 2006 048 551

(51) Int. Cl.
*B23K 15/00* (2006.01)
(52) U.S. Cl. .............. 416/244 R; 416/241 R; 415/216.1

(58) Field of Classification Search ................ 415/216.1; 416/244 R, 244 A, 241 R, 241 B
See application file for complete search history.

(56) References Cited

U.S. PATENT DOCUMENTS

| | | | | |
|---|---|---|---|---|
| 5,914,055 A * | 6/1999 | Roberts et al. | ............. | 219/76.15 |
| 6,006,878 A * | 12/1999 | Macdonald et al. | ......... | 192/3.29 |
| 6,778,051 B2 * | 8/2004 | Shirase et al. | ................ | 335/278 |
| 2002/0136659 A1 | 9/2002 | Staubli et al. | | |
| 2011/0097142 A1 * | 4/2011 | Bassler et al. | ................ | 403/337 |

FOREIGN PATENT DOCUMENTS

| | | |
|---|---|---|
| DE | 4413101 A1 | 10/1995 |
| EP | 1002935 A1 | 5/2000 |
| EP | 1134358 A2 | 9/2001 |
| EP | 1243754 A2 | 9/2002 |

* cited by examiner

*Primary Examiner* — Gary F. Paumen
(74) *Attorney, Agent, or Firm* — William G. Anderson; Stephan A. Pendorf; Patent Central LLC

(57) ABSTRACT

The invention relates to an exhaust gas turbocharger (1) having a turbine wheel arrangement (20), comprising: a turbine wheel (4) and a shaft (21), which can be connected to the turbine wheel (4) by means of a connecting section (22), wherein the connecting section (22) has a trunnion (23) with a diameter ($D_Z$) that is smaller than the largest diameter ($D_{WA}$) of the shaft (21).

14 Claims, 3 Drawing Sheets

TURBOCHARGER

DESCRIPTION

The invention relates to a turbocharger according to the preamble of claim 1, to a turbine wheel arrangement of a turbocharger, according to the preamble of claim 7, and to a method for producing a turbine wheel arrangement of this type, according to claim 9.

A generic turbocharger is known from EP 1 357 255 A1.

A typical turbine wheel connection by the friction welding of the wheel to the shaft is described, for example, in DE 10 2005 015 947 B3.

In this context, in the prior art up to now, the diameters of the two parts to be connected are identical, and the bead occurring as a result of the connection is arranged outside the shaft diameter and is removed again completely by means of subsequent cutting machining.

The object of the present invention is to provide a turbocharger of the type specified in the preamble of claim 1, which makes it possible to simplify the production of the exhaust gas turbocharger or of its turbine wheel arrangement.

This object is achieved by means of the features of claims 1, 7 and 9 respectively.

What is achieved by the design according to the invention or the procedure of the method according to the invention is that a shaft journal of the stepped turbocharger shaft has a smaller diameter than the largest diameter of the shaft. This supports the advantage that the bead, which occurs as a result of the welding operation, preferably the friction welding operation, for connecting the turbine wheel and journal, no longer has to be machined.

The subclaims contain advantageous developments of the invention.

Further details, advantages and features of the invention may be gathered from the following description of an exemplary embodiment, with reference to the drawing in which.

Figure 1:
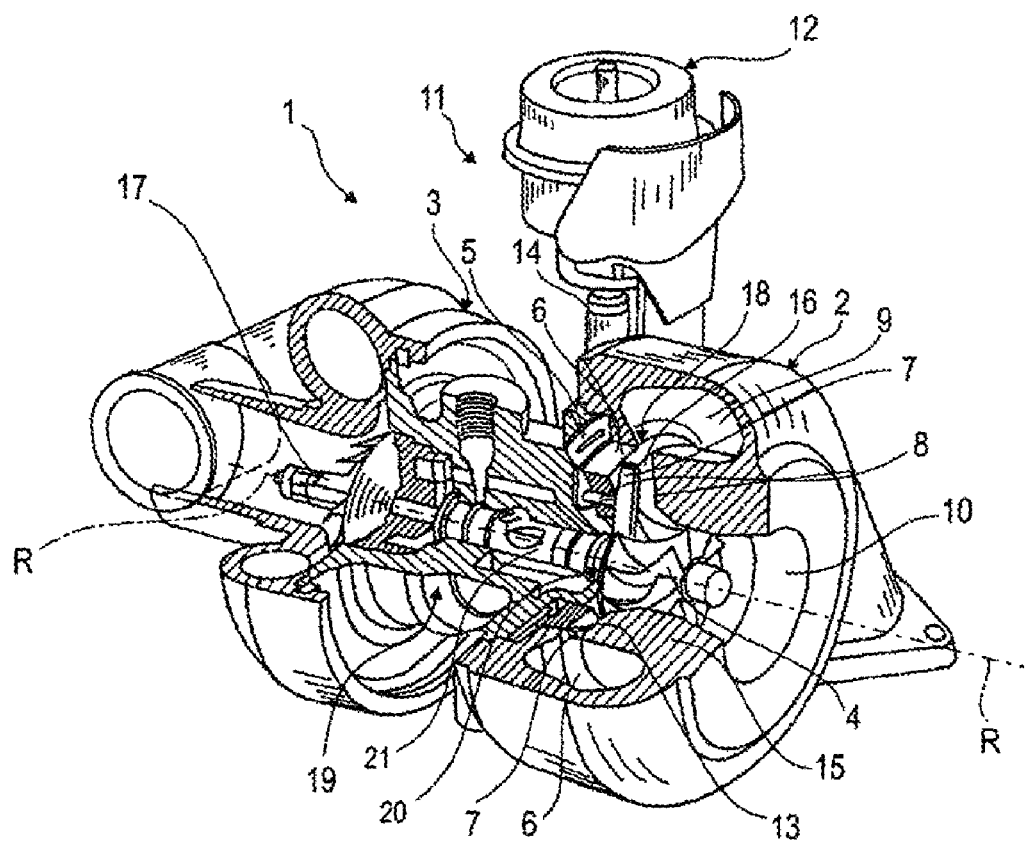
FIG. 1 shows a sectional perspective illustration of the basic set-up of a turbocharger according to the invention.

FIG. 1 illustrates a turbocharger 1 according to the invention which has a turbine casing 2 and a compressor casing 3 connected to the latter via a bearing casing 19. The casings 2, 3 and 19 are arranged along an axis of rotation R. The turbine casing 2 is shown partially in section, in order to make clear the arrangement of a blade bearing ring 6 as part of a radially outer guide blade cascade 18 which has a plurality of guide blades 7 distributed over the circumference and having pivot axes or blade shafts 8. Nozzle cross sections are thereby formed, which are larger or smaller, depending on the position of the guide blades 7, and which act to a greater or lesser extent upon the turbine rotor 4, mounted in the middle of the axis of rotation R, with the exhaust gas from an engine which is supplied via a supply duct 9 and is discharged via a central connection piece 10, in order to drive, via the turbine rotor 4, a compressor rotor 17 seated on the same shaft.

In order to control the movement or position of the guide blades 7, an actuating device 11 is provided. This may be designed in any desired way, but a preferred embodiment has a control casing 12 which controls the control movement of a tappet member 14 fastened to it, in order to convert the movement of said tappet member onto an adjusting ring 5, located behind the blade bearing ring 6, into a slight rotational movement of said adjusting ring. A free space 13 for the guide blades 7 is formed between the blade bearing ring 6 and an annular part 15 of the turbine casing 2. So that this free space 13 can be ensured, the blade bearing ring 6 has spacers 16 formed in one piece. In the example, three spacers 16 are arranged at an angular interval of 120° in each case on the circumference of the blade bearing ring 6. Basically, however, it is possible to provide more or fewer spacers 16 of this type.

Figure 2:
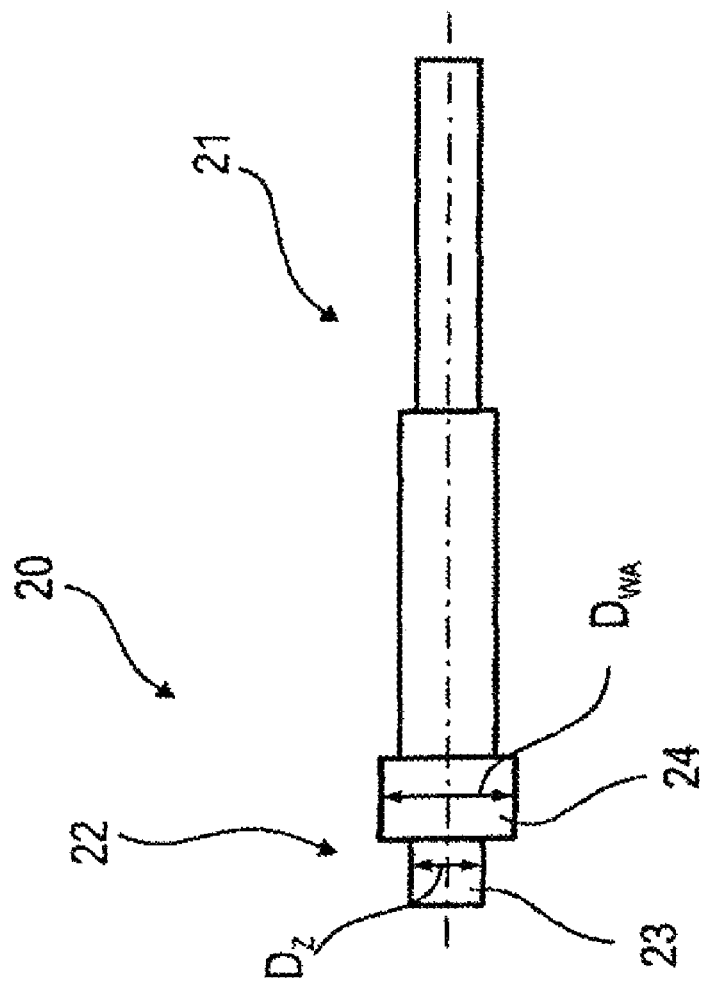
FIG. 2 shows a diagrammatically simplified illustration of the turbine wheel arrangement according to the invention before the connection of the shaft and turbine wheel.
Figure 2:
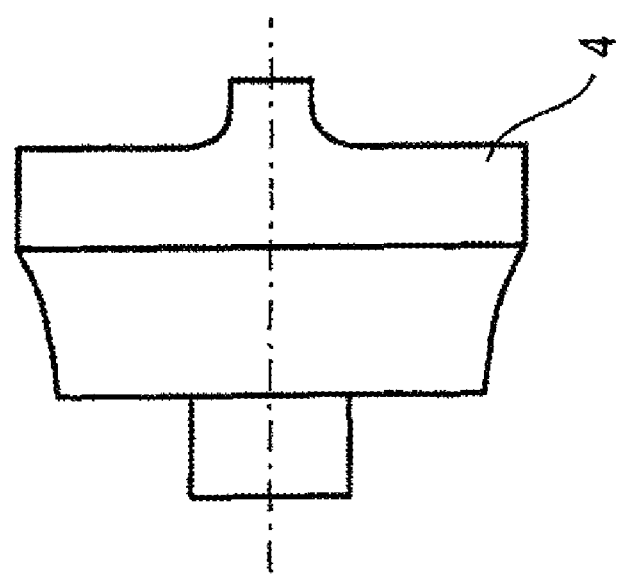

In FIG. 2, the not yet connected parts of the turbine wheel arrangement 20 of the exhaust gas turbocharger 1 illustrated in FIG. 1 are illustrated in detail in diagrammatically simplified form. This turbine wheel arrangement 20 has, in addition to the already mentioned turbine wheel 4 and shaft 21, a connecting portion 22, via which the turbine wheel 4 can be connected to the shaft 21.

According to the invention, the connection portion 22 is provided with a journal 23. As becomes clear from the illustration in FIG. 2, the connecting journal 23 has a diameter $D_Z$ which, in the example illustrated, amounts at most to about 90% of a diameter $D_{WA}$ of a shaft shoulder 24.

In the method according to the invention, to produce the turbine wheel arrangement 20 illustrated in FIG. 2, first the turbine wheel 4 is produced, for example by means of a casting operation. For this purpose, titanium aluminum alloys or else a nickel-based alloy may be used.

Furthermore, the shaft 21 is produced from austenitic, martensitic or heat-resistant steels or else from tempering steels, such as, for example, 42CrMo4, and also nickel-based alloys. In this case, the journal 23 explained above is provided with a diameter $D_Z$ which is smaller than the maximum diameter of the shaft 21, in the example illustrated it is smaller than the diameter $D_{WA}$ of the shaft shoulder 24.

Figure 3:
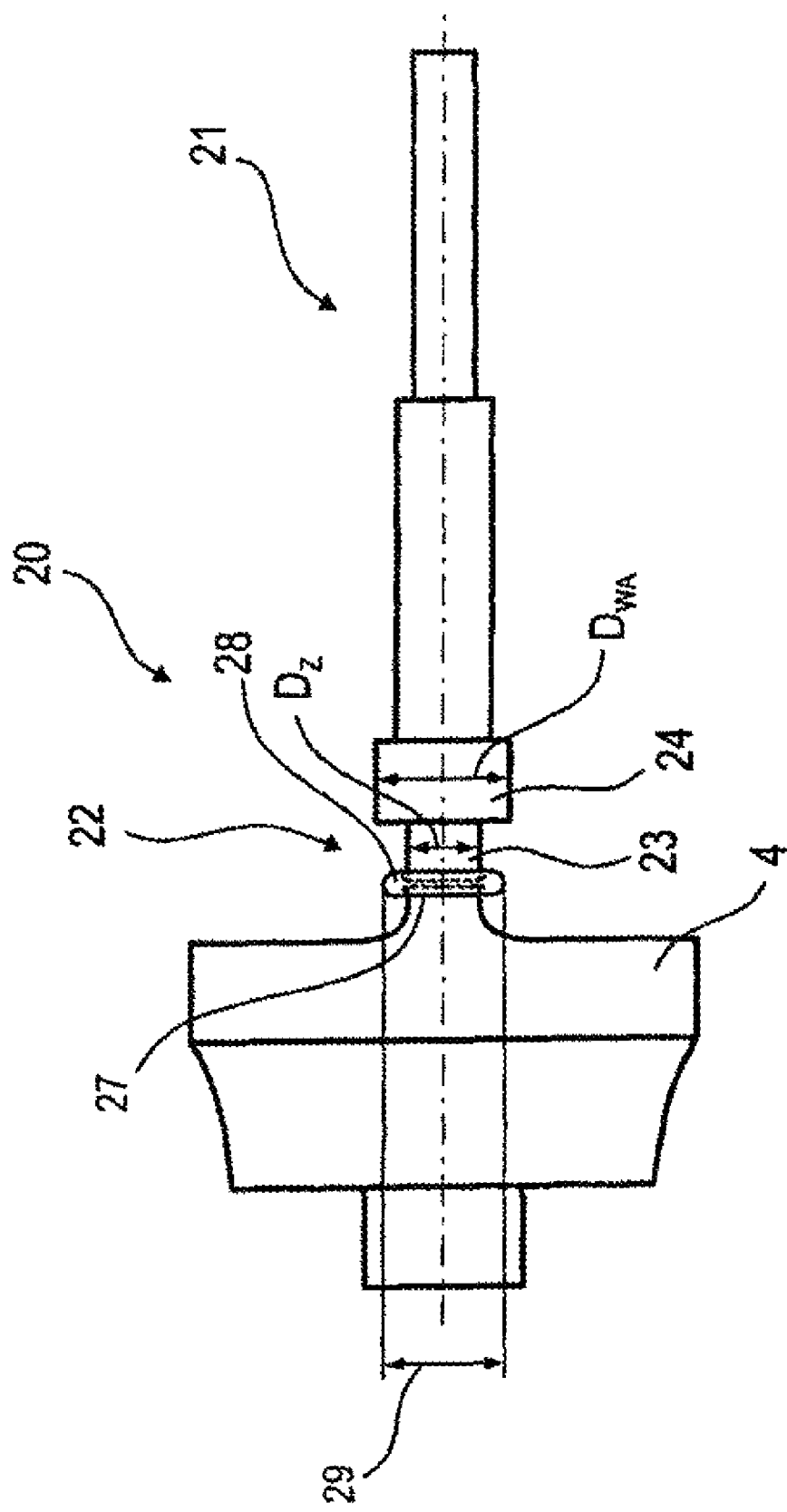
FIG. 3 shows an illustration, corresponding to FIG. 2, of the turbine wheel arrangement according to the invention in the state of final assembly.

To connect the turbine wheel 4 and the shaft 21, a welding operation, in particular a friction welding operation, is carried out, in which the weld seam 27 which is evident from FIG. 3 and a bead 28 occur. This gives rise, on account of the selected dimension for the diameter $D_Z$ of the journal 23, to a bead outside diameter 29 which is smaller than the here largest shaft diameter $D_{WA}$ of the shaft 21.

A suitable choice of the journal diameter $D_Z$ can thus achieve the advantage that the bead 28 does not project beyond the shaft diameter and consequently does not have to be reworked.

As stated, the method according to the invention may employ for preference a friction welding operation in which either the components 4 and 21 explained above are preheated or the friction welding also takes place without a preheating of said components.

LIST OF REFERENCE SYMBOLS

1 Turbocharger
2 Turbine casing
3 Compressor casing
4 Turbine wheel
5 Adjusting ring
6 Blade bearing ring
7 Guide blades
8 Blade shaft
9 Supply duct
10 Axial connection piece
11 Actuating device
12 Control casing
13 Free space for guide blades 7
14 Tappet member
15 Annular part of the turbine casing 2

16 Spacer/spacer boss
17 Compressor rotor
18 Guide blade cascade/guide blade apparatus
19 Bearing casing
20 Turbine wheel arrangement
21 Shaft
22 Connecting portion, preferably connected in one piece to the shaft 21
23 Journal
24 Shaft shoulder
27 Weld seam, in particular friction weld seam
28 Bead
29 Bead outside diameter

The invention claimed is:

1. An exhaust gas turbocharger (1) with a turbine wheel arrangement (20) which has:
 a turbine wheel (4) and
 a shaft (21) which is connected to the turbine wheel via a connecting portion (22) by means of a welded joint, the connecting portion (22) having a journal (23) with a diameter (DZ) which is smaller than the largest diameter (DWA) of the shaft (21), wherein the welded joint is a friction welded joint having a bead (28) which comprises a bead outside diameter (29) which is smaller than the largest diameter (DWA) of the shaft (21).

2. The exhaust gas turbocharger as claimed in claim 1, wherein the journal (23) of the connecting portion (22) amounts at most to about 90% of the largest diameter (DWA) of the shaft (21).

3. The exhaust gas turbocharger as claimed in claim 1, wherein the material of the turbine wheel (4) is a TiAl alloy.

4. The exhaust gas turbocharger as claimed in claim 1, wherein the material of the turbine wheel (4) is a nickel-based alloy.

5. The exhaust gas turbocharger as claimed in claim 1, wherein the material of the shaft (21) is selected from the group consisting of austenitic steels, martensitic steels, heat-resistant steels, tempering steels and nickel-based alloys.

6. A turbine wheel arrangement (20) of an exhaust gas turbocharger (1),
 with a turbine wheel (4) and
 with a shaft (21) which is connected to the turbine wheel (4) via a connecting portion (22),
 wherein the connecting portion (22) has a journal (23) with a diameter (DZ) which is smaller than the largest shaft diameter (DWA) of the shaft (21).

7. The turbine wheel arrangement as claimed in claim 6, wherein the journal (23) of the connecting portion (22) amounts at most to about 90% of the largest diameter (DWA) of the shaft (21).

8. A method for producing a turbine wheel arrangement (20), having a turbine wheel (4) and a shaft (21), of an exhaust gas turbocharger (1), with the following method steps:
 producing the turbine wheel (4),
 producing the shaft (21) with a connecting portion (22) which has a journal (23), the diameter (DZ) of which is smaller than the largest diameter (DWA) of the shaft (21), and
 connecting the turbine wheel (4) and of the shaft (21) by a friction welding operation in which the journal (23) is welded to the turbine wheel (4), with production of a bead (28), the outside diameter (29) of which is smaller than the largest diameter (DWA) of the shaft (21).

9. The method as claimed in claim 8, wherein the turbine wheel (4) and the shaft (21) are welded together with preheating.

10. The method as claimed in claim 8, wherein the turbine wheel (4) and the shaft (21) are welded together without preheating.

11. The method as claimed in claim 8, wherein the journal (23) of the connecting portion (22) amounts at most to about 90% of the largest diameter (DWA) of the shaft (21).

12. The turbine wheel arrangement as claimed in claim 6, wherein the material of the turbine wheel (4) is a TiAl alloy.

13. The turbine wheel arrangement as claimed in claim 6, wherein the material of the turbine wheel (4) is a nickel-based alloy.

14. The turbine wheel arrangement as claimed in claim 6, wherein the material of the shaft (21) is selected from the group consisting of austenitic steels, martensitic steels, heat-resistant steels, tempering steels and nickel-based alloys.

* * * * *